Jan. 8, 1957  A. F. M. CLAESSEN  2,776,740
CONVEYOR DISCHARGE MECHANISM
Filed Feb. 15, 1955

Inventor
Antonius F. M. Claessen
By Cushman, Darby & Cushman
attorneys

2,776,740
CONVEYOR DISCHARGE MECHANISM

Antonius F. M. Claessen, Heerlen, Netherlands, assignor to Stamicarbon N. V., Heerlen, Netherlands Application February 15, 1955, Serial No. 488,236

Claims priority, application Netherlands February 17, 1954

6 Claims. (Cl. 198—106)

The present invention relates to conveyors and more particularly to improvements in conveyors incorporating endless conveying means for moving loose material to an end of the conveyor where the material is discharged.

Examples of such conveyors are endless belt conveyors, and scraper conveyors comprising a series of scrapers attached to endless carrying chains. With such conveyors, it often occurs that not all of the material loaded onto the conveyor is properly discharged at the discharge end inasmuch as there is a tendency for a small amount to cling to the endless conveying means, especially if the material is damp. This material which fails to leave the conveyor at the discharge point usually drops when it has passed the reversing point of the conveying means, i. e., when it has started its movement along the return flight of the conveyor, and consequently it becomes heaped up under the discharge end of the conveyor and has to be periodically shovelled away.

One instance in which this difficulty has been encountered is in mechanical mining in connection with face conveyors for the conveyance of the mined materials, e. g. coal, along the face to the gate road.

Accordingly, it is an object of the present invention to provide a conveyor having means for preventing the accumulation of material at the discharge end thereof.

Another object of the invention is to provide a conveyor in which material which drops from the return flight of the conveyor is caught by a conveyor of simple design.

A further object of the invention is to provide a conveyor wherein any material which may drop from the return flight of the conveyor is caught by a secondary conveyor which is reciprocated by the action of the main conveyor so as to transport the dropped material in the same direction as the material in the main conveyor.

These and other objects of the present invention will become more apparent during the course of the following detailed description and appended claims.

The invention may best be understood with reference to the accompanying drawings, wherein an illustrative embodiment is shown.

Figure 3:
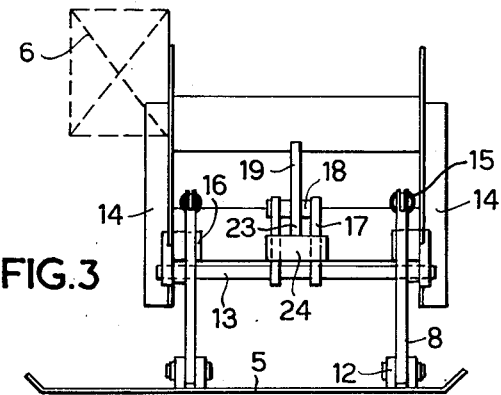
Figure 3 is an end view of the mechanism shown in Figure 2, looking from the right hand end of that figure, with certain parts omitted for the sake of clarity.

Referring now more particularly to the drawings, there is shown a conveyor 1 having a discharge end 2 which extends into a gate road 3, where the coal tips onto a belt conveyor 4. Disposed beneath the delivery end 2 is a plate 5 which extends over the entire width of the conveyor 1 and over the width of the space between the conveyor and the mine face along which a coal mining machine 6 (shown in Figure 3 in dotted lines) is reciprocated. The plate 5 is mounted, as by chains 7 and bars 8, for fore and aft movement in a manner hereinafter to be more fully described. Plate 5 adjoins a steeply sloping plate 9 of similar width which is mounted on chains or ropes 10 and 11 depending from the conveyor. If desired, plate 9 may be coupled to plate 5.

The bars 8 are hinged to plate 5, as at 12, and are connected to each other by a shaft 13 which is rotatably supported in the frame 14 of the conveyor 1. Extending between the upper end of each of the bars 8, above the shaft 13, and the frame 14 is a spring 15 which urges the associated bar 8 against a stop 16, rigidly mounted on the frame. The shaft 13 has a pair of spaced bars 17 extending upwardly therefrom and a pin 18 is secured between the upper ends of the bars. A rocking member 19 having an upper arm 20 and a lower arm 23 is rotatably mounted intermediate its ends on the pin 18 between the bars 17. The upper arm 20 of member 19 intrudes into the path of conveyor scrapers 21 traveling on the lower, return, flight of the conveying means. The lower arm 23 of the rocking member 19 carries a stop plate 24 to which is connected one end of a spring 25. The other end of spring 25 is anchored to the conveyor frame 14, so as to normally urge the rocking member into the position shown in the drawings wherein the stop plate 24 bears against the bars 17.

Figure 1:
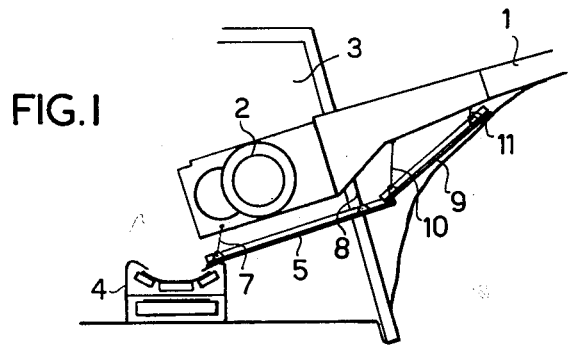
Figure 1 is a side elevational view of the delivery end of a face conveyor employed in mechanical coal mining.
Figure 2:
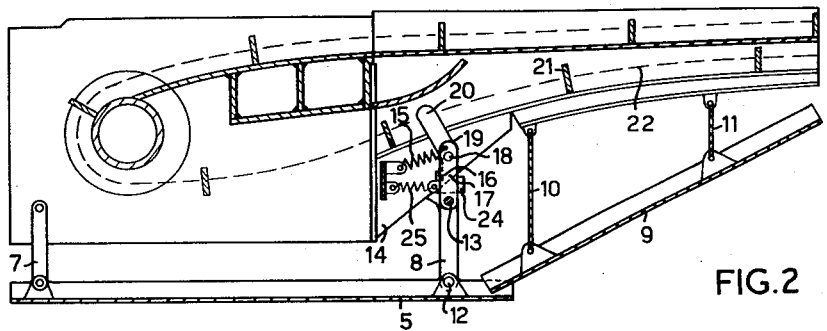
Figure 2 is a vertical sectional view of the same conveyor part, but on a larger scale, showing the mechanism for driving the plate.

When the conveyor is in operation, the conveying means comprising the scrapers 21 and carrying chains 22 (one of which is indicated in dotted lines in Figure 2), travel so that the scrapers on the lower flight move from left to right in Figure 2 and, as each scraper 21 strikes the upper arm 20 of the rocking member 19, the member 19 and the bars 17 are pivoted together in a clockwise direction against the action of the springs 15. In this manner, the shaft 13 is rotated thereby swinging the bars 8 and the plate 5 in one direction. This movement continues until the scraper 21 slips past the upper end of the arm 20 whereupon, under the action of springs 15, the arms 8 and the plate 5 spring back into their original position determined by stops 16. As the coal which has fallen onto the plate 5 is unable to follow this return movement, it is advanced along the plate 5 in the direction of the gate road 3.

Material dropping from the return flight scrapers 21 to the rear of the plate 5, and material pushed off the end of the space between the conveyor and the coil face by the machine 6 falls onto plate 9 and slides down therefrom onto the plate 5, and from there is discharged into the belt conveyor 4 in the manner described above. In this way, accumulation of spilled coal in the gate road 3 is prevented.

If the conveying means is driven in the opposite direction, e. g., for transporting equipment at the mine face, the rocking member 19 is rocked by the scrapers 21 about its pivot pin 18 in a counterclockwise direction, as viewed in Figure 2, the member returning to its original position under the action of springs 25 as each scraper passes. However, it will be noted that this rocking of the member 19 does not cause reciprocation of the plate 5.

With a belt conveyor one or more levers of the type described above may be operated by means of rollers driven by the belt.

It is also to be understood that the form of the invention herewith shown and described is to be taken as a preferred embodiment of the same and that various changes may be made without departing from the spirit of the invention or the scope of the appended claims.

I claim:

1. In a conveyor having a frame and endless scraper conveying means for conveying loose material to an end of the conveyor where the material is discharged; a plate arranged to extend beneath an end length of the return flight of the conveying means and over the entire width of the conveyor so as to catch conveyed material which may fall from the conveying means at the commencement of travel along the return flights, having failed to leave the conveyor at the discharge point; means for supporting said plate beneath said conveyor for fore and aft movement; said supporting means including a shaft journaled in the conveyor frame and a pair of spaced bars extending downwardly from said shaft and having their lower ends hinged to said plate; a second pair of spaced bars extending upwardly from said shaft between said first mentioned pair of bars, a lever pivoted intermediate its ends between the upper ends of said second pair of bars; the upper end of said lever being disposed in the return flight path of travel of the scrapers of the conveying means; a stop plate on the lower end of said lever for engagement with said second pair of bars; movement of the scrapers of the conveying means in one direction causing said lever to repeatedly pivot in one direction whereby said stop plate engages said second pair of bars to move the latter and hence the plate therewith; movement of the scrapers of the conveying means in the opposite direction causing said lever to repeatedly pivot in the opposite direction whereby said stop plate moves away from said second pair of bars permitting the latter and hence the plate to remain stationary; and spring means for rapidly returning said lever into the position wherein the upper end thereof is disposed into the path of travel of the scrapers.

2. In a conveyor having endless conveying means for conveying loose material to the end of the conveyor where the material is discharged, abutment means spaced along said conveying means; a plate arranged to extend over an end length of the return flight of the conveying means and over the entire width of the conveyor so as to catch conveyed material which may fall from the conveying means at the commencement of travel along the return flight, having failed to leave the conveyor at the discharge point; and means for supporting said plate for fore and aft movement so as to cause material which falls thereon to discharge in a predetermined direction, said supporting means including means arranged to be engaged by said abutment means so that said plate will be repeatedly swung in one direction during the movement of said conveying means, and means for rapidly returning the plate to the original position after each such movement so that material on the plate does not follow the return movement and is consequently transported along with the plate.

3. In a conveyor having endless conveying means for conveying loose material to an end of the conveyor where the material is discharged; abutment means spaced along said conveying means, a plate arranged to extend under an end length of the return flight of the conveying means and over the entire width of the conveyor so as to catch conveyed material which may fall from the conveying means at the commencement of travel along the return flight, having failed to leave the conveyor at the discharge point; and means for supporting said plate for fore and aft movement so as to cause material which falls thereon to discharge in a predetermined direction, said supporting means including a pivoted lever arranged to be engaged by said abutment means so that during operation of the conveyor the lever and the plate are repeatedly swung in one direction, and means for rapidly returning the plate to the original position after each such movement so that material on the plate does not follow the return movement and is consequently transported along with the plate.

4. A conveyor of the character described in claim 3 wherein said abutment means includes scrapers arranged to convey the loose material to the end of the conveyor.

5. In a conveyor having endless conveying means for conveying loose material to an end of the conveyor where the material is discharged; abutment means spaced along said conveying means; a plate arranged to extend under an end length of the return flight of the conveying means and over the entire width of the conveyor so as to catch conveyed material which may fall from the conveying means at the commencement of travel along the return flight, having failed to leave the conveyor at the discharge point; and means for supporting said plate for fore and aft movement so as to cause material which falls thereon to discharge in a predetermined direction, said plate supporting means including a first lever having one end hinged to the plate, a second lever disposed so as to cooperate with said abutment means and be repeatedly moved thereby from a certain position in a direction dependent on the direction of movement of the conveying means, said second lever being operatively connected with said first lever so that when the conveying means moves in one direction said second lever transmits the repeated movements to the first lever thereby moving the plate, while when the conveying means moves in the other direction said second lever moves relatively to the said first lever thereby leaving the plate stationary.

6. A conveyor of the character described in claim 5 wherein said second lever is spring loaded so that it springs back into said certain position after each of said repeated movements effected by the conveying means.

References Cited in the file of this patent

FOREIGN PATENTS 664,953    Great Britain  ---------- Jan. 16, 1952